(12) United States Patent
Hiraide

(10) Patent No.: US 8,459,761 B2
(45) Date of Patent: Jun. 11, 2013

(54) RECORDING APPARATUS

(75) Inventor: Toshinori Hiraide, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 372 days.

(21) Appl. No.: 13/015,433

(22) Filed: Jan. 27, 2011

(65) Prior Publication Data

US 2011/0187769 A1 Aug. 4, 2011

(30) Foreign Application Priority Data

Jan. 29, 2010 (JP) .................. 2010-017825

(51) Int. Cl.
*B41J 29/38* (2006.01)
*B41J 2/165* (2006.01)
*B41J 2/045* (2006.01)

(52) U.S. Cl.
USPC .................................. 347/5; 347/27; 347/70

(58) Field of Classification Search
USPC ........................................... 347/5, 27, 70, 94
See application file for complete search history.

(56) References Cited

FOREIGN PATENT DOCUMENTS

| JP | 2003-307890 | 10/2003 |
|---|---|---|
| JP | 2003307890 | * 10/2003 |

* cited by examiner

*Primary Examiner* — Uyen Chau N Le
*Assistant Examiner* — Kajli Prince
(74) *Attorney, Agent, or Firm* — Workman Nydegger

(57) ABSTRACT

A recording apparatus that records onto recording paper includes: a main case housing a noise source that generates noise when printing is carried out; a scanner space portion that is within the main case but that is independently separate from a housing space portion of the noise source; and a communication tube portion that communicates between the housing space portion and the scanner space portion. An inner surface area that intersects with the axial direction of the communication tube portion at the inner surface of the scanner space portion is formed of a document platform glass whose surface density is higher than that of the material of which the other wall surface areas are formed in the inner surface of the scanner space portion.

6 Claims, 2 Drawing Sheets

RECORDING APPARATUS

The entire disclosure of Japanese Patent Application No. 2010-017825, filed Jan. 29, 2010 is expressly incorporated by reference herein.

BACKGROUND

1. Technical Field

The present invention relates to recording apparatuses such as, for example, ink jet printers.

2. Related Art

Ink jet recording apparatuses that, for example, eject ink onto recording paper (a recording medium) have been widely known for some time as recording apparatuses that carry out printing processes (recording processes) onto recording media. With such recording apparatuses, noise is emitted when, for example, a recording paper transport mechanism, a recording mechanism, or the like operates, and thus recording apparatuses featuring various noise suppression measures have recently been proposed (for example, JP-A-2003-307890).

With the recording apparatus disclosed in JP-A-2003-307890, a resonance tube and reflective surfaces are formed in the dead space within the recording apparatus in order to reduce noise generated within the recording apparatus. In other words, a delayed-frequency sound having one half the wavelength of the noise emitted from the recording apparatus is generated by the resonance tubes, and a reduction in the noise is achieved by causing delayed propagation sound amplified by reflecting the delayed-frequency sound using the reflective surfaces to interfere with the direct propagation sound of the noise emitted from the recording apparatus.

Incidentally, in the stated past recording apparatus that uses a resonance tube, only sound of a specific frequency is taken as a target for noise suppression. However, in recording apparatuses, sounds in the entire frequency range can appear as noise, not just sounds of a specific frequency. Accordingly, with the aforementioned past recording apparatus, there has been the risk that sounds aside from the specific frequency also result in noise and pass from the interior to the exterior of the recording apparatus.

SUMMARY

An advantage of some aspects of the invention is to provide a recording apparatus capable of reducing noise across the entire frequency range that is generated within the recording apparatus.

A recording apparatus according to an aspect of the invention is a recording apparatus, including an image reading unit that reads the content of a document, that records onto a recording medium. The recording apparatus includes: a recording unit that records onto the recording medium; a noise source that generates a noise when recording is being carried out on the recording medium; a housing space portion that houses the recording unit and the noise source; a partial space portion that moves an image data obtaining unit for reading the content of the document and obtaining image data back and forth; a communication tube that communicates between the housing space portion and the partial space portion; and an inner surface of the partial space portion configured of an inner surface area that intersects with the axial direction of the communication tube and a wall surface area. At least part of the inner surface area is a high-density member having a surface density that is higher than the material of which the wall surface area is formed.

According to this configuration, noise of a frequency aside from a specific frequency that is transmitted from the housing space portion in which the noise source is located, though the communication tube, and into the partial space portion can be reflected and blocked by the inner surface area of the high-density member that intersects with the axial direction of the communication tube at the inner surface of the partial space portion. Accordingly, the noise can be suppressed from escaping to the exterior of the recording apparatus, and noise of the entire frequency range that has been generated within the recording apparatus can be reduced.

A recording apparatus according to another aspect of the invention further includes a sound absorption material, configured of a porous material, that covers an opening of the communication tube portion.

According to this configuration, noise of frequencies aside from the specific frequency generated within the recording apparatus is absorbed by the sound absorption material when the noise passes through the communication tube portion. This makes it possible to reduce noise in an effective manner.

In a recording apparatus according to another aspect of the invention, the sound absorption material covers the opening of the communication tube portion on the side that faces the partial space portion.

According to this configuration, noise that is reflected back toward the communication tube portion side after colliding with the inner surface area formed by the high-density member of the partial space portion can be absorbed by the sound absorption material. This makes it possible to reduce noise in an even more effective manner.

A recording apparatus according to another aspect of the invention further includes a conductive member that conducts the noise generated by the noise source within the housing space portion toward the communication tube portion.

According to this configuration, the noise is conducted to the communication tube portion by the conductive member, and thus the diffusion of the noise generated within the housing space portion can be suppressed, thus making it possible to absorb and block the noise in an effective manner.

A recording apparatus according to another aspect of the invention includes an image reading unit that reads the content of a document; in the image reading unit, a movement space, in which a image data obtaining unit for reading the content of the document and obtaining image data is moved back and forth, is configured by the partial space portion; and a document platform that holds the document whose content is to be read is configured of a high-density member.

According to this configuration, the partial space portion and high-density member that function as a resonating space for absorbing and blocking noise are also used as the movement space of the image data obtaining unit and the document platform in the existing image reading unit, and thus it is not necessary to increase the number of components in the recording apparatus or secure further space for the resonating space. Accordingly, noise can be reduced while also suppressing an increase in the size of the apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an ink jet recording apparatus, which is one type of recording apparatus, that embodies the invention will be described according to FIG. 1 and FIG. 2. Note that an ink jet recording apparatus (called simply a "recording apparatus" hereinafter) 11 according to this embodiment is a complex machine capable of printing processes (recording processes) as well as image reading processes in which an image of an original document (that is, the content of the document, such as text, diagrams, or the like) is read and electronic data in a format that corresponds to the image is generated.

Figure 1:
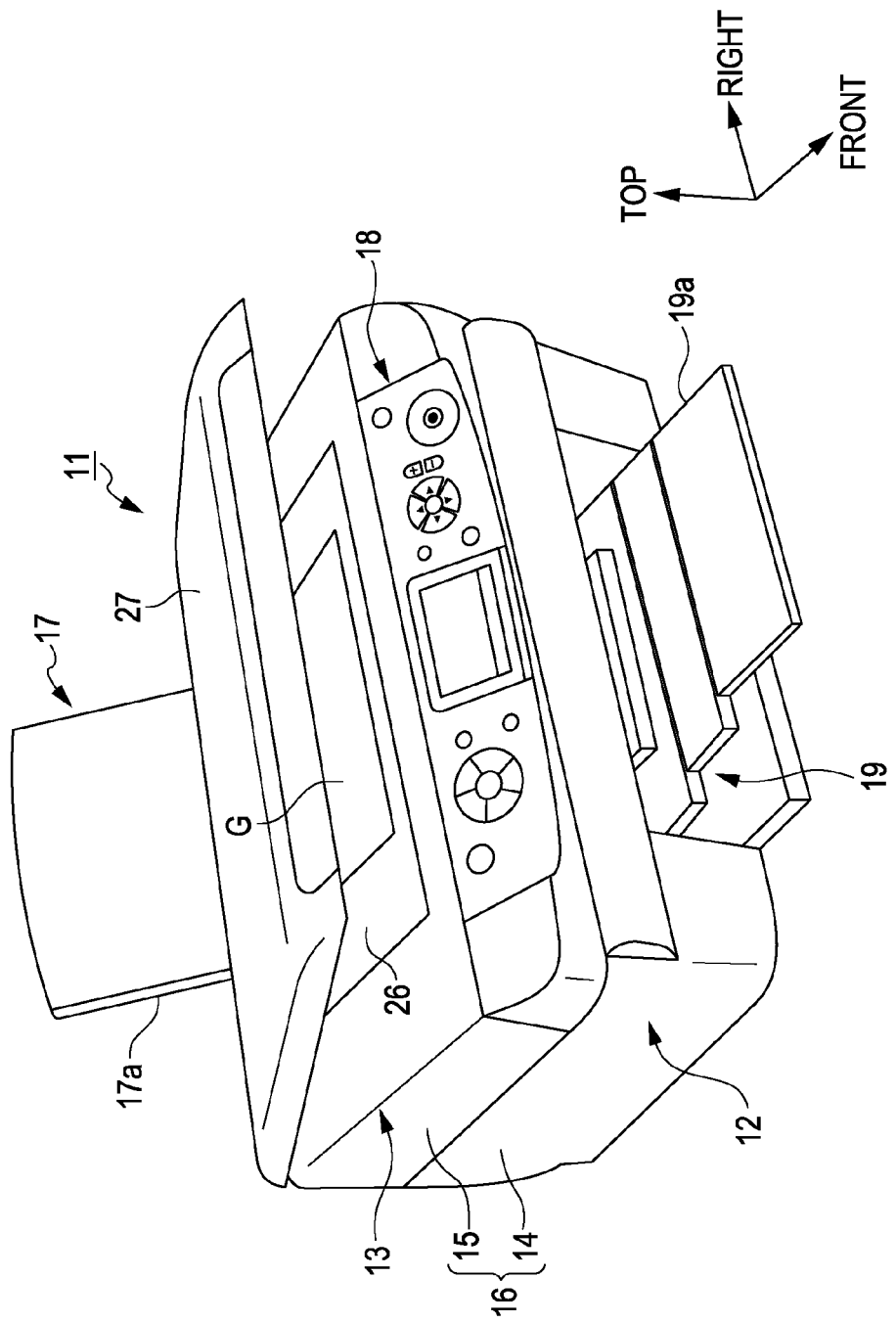
FIG. 1 is a perspective view illustrating a recording apparatus according to an embodiment.

As illustrated in FIG. 1, the recording apparatus 11 includes, in its lower section, a printer unit 12 that carries out printing processes, and includes, in its upper section, a scanner unit 13 serving as an image reading unit that carries out image reading processes. The printer unit 12 includes a lower case 14, made of a resin material and having a closed-bottom box-like shape, whereas the scanner unit 13 includes an upper case 15, made of a resin material and having a closed-bottom box-like shape, whose dimensions in the vertical direction are smaller than those of the lower case 14. A main case 16 that defines the outer contours of the recording apparatus 11 is configured by stacking the upper case 15 upon the lower case 14.

An automatic paper feed mechanism 17, having a support 17a in which recording paper P serving as a recording medium is set in a stacked state, is provided on the rear surface side (the right surface in FIG. 2) of the main case 16 in the recording apparatus 11. Meanwhile, an operation panel 18 is provided in the upper area of the front surface side of the main case 16, whereas a discharge port 19, having a discharge section 19a capable of supporting recording paper P that is discharged to the exterior of the main case 16 from within the main case 16, is provided in the lower area of the front surface side of the main case 16.

Figure 2:
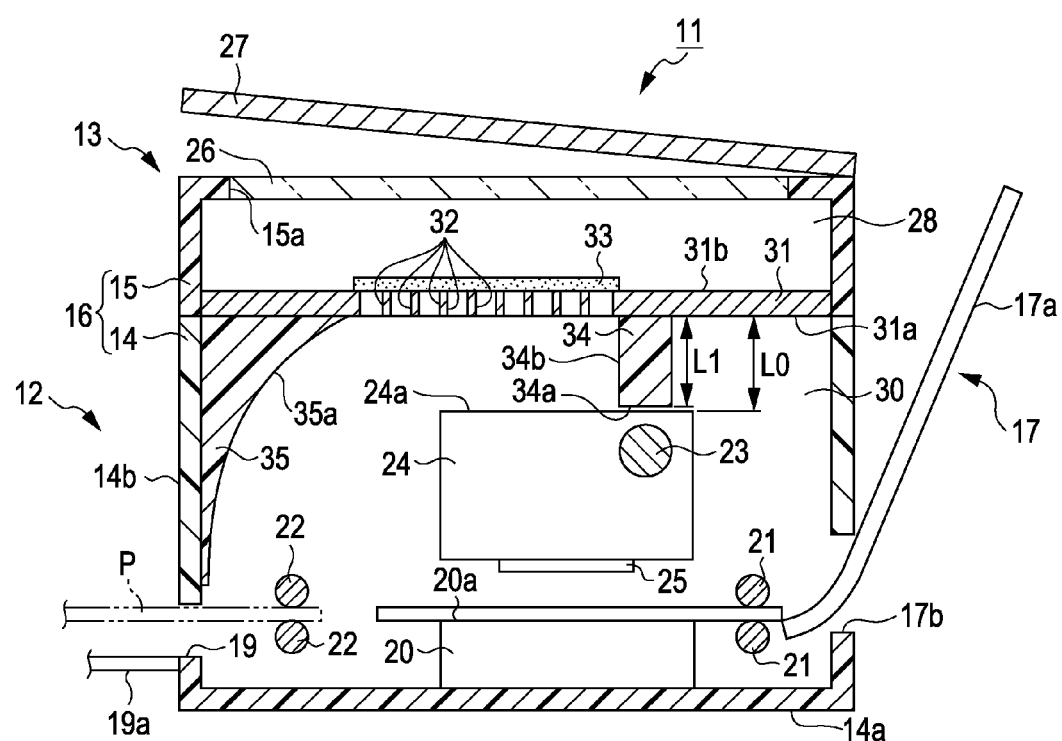
FIG. 2 is a general cross-sectional elevational view illustrating a recording apparatus according to an embodiment.

As illustrated in FIG. 2, a platen 20, having a support surface 20a that supports the recording paper P transported for the purposes of recording from the bottom, is provided upon a base wall 14a of the lower case 14 within the printer unit 12. The recording paper P is fed one sheet at a time, passing through a paper feed opening 17b from the rear, onto the support surface 20a of the platen 20, due to the rotation of an upstream roller 21, provided in a position that is further upstream from the platen 20 in the recording paper P transport direction, that is rotated based on the driving of a paper feed motor (not shown). The recording paper P that has been fed onto the support surface 20a of the platen 20 due to the rotation of the upstream roller 21 is then discharged to the exterior of the main case 16 of the recording apparatus 11 from the discharge opening 19 by being transported forward as a result of the rotation of a downstream roller 22 provided further downstream than the platen 20 in the recording paper P transport direction.

A guide shaft 23 that extends in the horizontal direction, which is orthogonal to the recording paper P transport direction, is provided so as to extend above the platen 20. A carriage 24 is supported by the guide shaft 23 so as to be capable of back-and-forth movement along the axial direction of the guide shaft 23. The carriage 24 is moved back and forth along the axial direction of the guide shaft 23 by a driving mechanism (not shown) configured of, for example, a driving motor, a driving belt, and the like. Furthermore, a recording head 25 that ejects ink toward the recording paper P is provided on the bottom surface of the carriage 24.

As illustrated in FIG. 2, a document platform glass 26, formed of a quadrangular-shaped transparent glass plate or the like and on which a document G is placed, is affixed to an opening portion 15a of the upper case 15 that defines the outer contours of the scanner unit 13 so as to seal the opening portion 15a. In addition, a document platform cover 27, which covers the document platform glass 26 when a document is being read, when the apparatus is not in use, and so on and that can be opened and closed, is provided in the upper case 15 of the scanner unit 13, and can be opened and closed using a hinge that is formed in the rear surface side thereof.

A scanner guide shaft (not shown) is provided on one end in the widthwise direction of a scanner space portion 28 formed by the upper case 15 of the scanner unit 13 and the document platform glass 26 (that is, the depth direction of the recording apparatus 11 and the horizontal direction in FIG. 2); the scanner guide shaft is provided so as to extend parallel to the document platform glass 26 and along the lengthwise direction of the scanner space portion 28 (that is, the horizontal direction of the recording apparatus 11 and the direction that is orthogonal to the paper surface in FIG. 2). A scanner carriage (not shown) of a length that corresponds to the widthwise direction of the document platform glass 26 is supported by the scanner guide shaft so as to extend in the horizontal direction that is orthogonal to the scanner guide shaft, and is provided so as to be capable of moving back and forth along the scanner guide shaft.

Note that the scanner carriage moves back and forth along the axial direction of the scanner guide shaft due to a driving mechanism (not shown) configured of, for example, a driving motor, a driving belt, and the like. In addition, an image input unit (not shown) for optically reading the content of the document is mounted in the scanner carriage. The image input unit is configured of a light source, a lens, a mirror, and photoelectric conversion elements (CCDs) disposed linearly along the lengthwise direction of the scanner carriage. The document placed upon the document platform glass 26 is irradiated with light through the document platform glass 26 by the light source of the image input unit mounted in the scanner carriage, and an image of the document is read by detecting the light reflected by the document using the photoelectric conversion elements. Accordingly, the scanner carriage functions as an image data obtaining unit, whereas the scanner space portion 28 functions as a movement space for the image data obtaining unit.

Furthermore, as shown in FIG. 2, the base wall portion of the upper case 15 in the scanner portion 13 functions as a partition wall 31 for partitioning the interior of the main case 16 of the recording apparatus 11 into a housing space portion 30 for housing the carriage 24, the platen 20, and so on, and the scanner space portion 28 in which the scanner carriage moves back and forth. In other words, the partition wall 31 configured of the base wall portion of the upper case 15 in the scanner portion 13 functions as a partition portion in which the upper portion of the interior of the main case 16 is partitioned and formed as a partial space portion (the scanner space portion 28) that is independent from the housing space portion 30.

Multiple (in FIG. 2, eight are shown) communication tube portions 32, which connect the housing space portion 30 configured in the interior space of the printer unit 12 with the scanner space portion 28 configured in the interior space of the scanner unit 13 and have a circular cross-sectional shape, are formed in the partition wall 31 of the main case 16 so as to be arrayed at regular intervals. In other words, the communication tube portions 32 are formed so as to open into a bottom surface 31a side, which is the side of the housing space portion 30 in the partition wall 31, and into a top surface 31b side, which is the side of the scanner space portion 28 in the partition wall 31. These communication tube portions 32 have a function for dampening noise of a specific frequency through a resonance phenomenon, using the scanner space portion 28 as a partial space portion.

In other words, in this embodiment, the carriage 24, which emits a sliding sound when moving back and forth along the guide shaft 23, the platen 20, which emits a contact sound (a paper feeding sound) when the recording paper P that is transported makes contact with the support surface 20a, and so on are sources of noise. However, the communication tube portions 32 and the scanner space portion 28 form a resonator whose rear air layer is the scanner space portion 28, thus dampening the noise of a specific frequency emitted from within the housing space portion 30. It should be noted that the diameters of the openings of the multiple communication tube portions 32, which are formed in almost the entirety of the partition wall 31, are all the same, and the shape of the communication tube portions 32 is calculated, based on the specific frequency of the noise that is to be dampened, using the following formula.

$$f = (c/2\pi)\sqrt{S/V \cdot L}$$

Here, f represents the frequency of the noise that is to be dampened, c represents the acoustic velocity, S represents the cross-sectional surface area of the openings of the communication tube portions 32, V represents the volume of the rear air layer of the communication tube portions 32 (that is, the scanner space portion 28), and L represents the length of the communication tube portions 32. For example, in this embodiment, the shape of the communication tube portions 32 is calculated based on the frequency of the carriage sliding sound that is generated as the carriage 24 moves, which is an example of the noise that is to be dampened.

Meanwhile, the openings of the communication tube portions 32 in the partition wall 31 on the side of the scanner space portion 28 are covered with a sound absorption material 33, which is configured of a porous material made of a fibrous one such as glass wool or the like or has interconnected cells as is the case with polyurethane foam, and which absorbs noise across the entire frequency range. The sound absorption material 33 has dimensions that correspond to the dimensions of the region in the partition wall 31 in which the communication tube portions 32 are formed, and covers the openings of all the communication tube portions 32 when placed upon that region.

Meanwhile, as shown in FIG. 2, a first conductive member 34, whose cross-sectional shape is a vertical rectangular shape and that is configured of the same resin material as the main case 16 (the lower case 14 and the upper case 15), is supported on the bottom surface 31a of the partition wall 31 in the main case 16 so as to extend downward within the housing space portion 30. To be more specific, the first conductive member 34 is provided so as to extend along the region in which the carriage 24 moves back and forth, in a state in which the first conductive member 34 extends downward from a position that is adjacent to the spatial region that is below the communication tube portions 32 formed in an array in the partition wall 31 and that corresponds to the guide shaft 23 in the vertical direction.

In addition, as shown in FIG. 2, the first conductive member 34 is formed so that the length L1 of the protrusion direction thereof (that is, the length from the bottom surface 31a of the partition wall 31 to a bottom end surface 34a of the first conductive member 34) is slightly less than the length L0 from the bottom surface 31a of the partition wall 31 to a top surface 24a of the carriage 24 that opposes the bottom surface 31a. In other words, the first conductive member 34 divides the spatial region above the carriage 24 into front and rear areas by extending downward in the vertical direction, but the top surface 24a of the carriage 24 does not make contact with the bottom end surface 34a of the first conductive member 34.

Furthermore, as shown in FIG. 2, a second conductive member 35, configured of the same resin material as the first conductive member 34 and whose cross-sectional shape has an approximately right-angle triangular shape on its bottom surface with the longest side of the triangle curved inward, is supported on the bottom surface 31a of the partition wall 31 in the main case 16 so as to extend downward within the housing space portion 30. To be more specific, the second conductive member 35 is provided in a location that is adjacent to the spatial region below the communication tube portions 32 formed in an array in the partition wall 31 and that is above the discharge port 19 of the printer unit 12, extending parallel to the first conductive member 34. In other words, the second conductive member 35 is supported within the housing space portion 30 by the contact surface with the two sides thereof that intersect with a foreword wall portion 14b of the lower case 14 in the main case 16 and the bottom surface 31a of the partition wall 31 serving as the affixed surfaces. A guide space region is formed by a curved surface 35a that is configured by the longest side that curves inward and a side surface 34b of the first conductive member 34, so that the cross-sectional spatial volume decreases in the upward direction, so as to guide noise that is generated in the housing space portion 30 toward the communication tube portions 32 that are formed in an array in the partition wall 31.

Next, operations of the recording apparatus 11 configured as described above will be described with particular attention given to operations when suppressing noise generated within the interior of the recording apparatus 11.

For example, when printing is commenced in the printer unit 12, the automatic paper feed mechanism 17 is driven and recording paper P is fed out from the support 17a; the paper P that has been fed out from the support 17a is then transported to a printing position upon the platen 20 by the upstream roller 21. At this time, noise is generated within the housing space portion 30, which is the interior space of the printer unit 12; this noise includes the operation sounds of the paper feed motor (not shown), sliding sounds arising due to the recording paper P sliding along the support surface 20a of the platen 20, and so on. Then, printing is carried out by the carriage 24 ejecting ink onto the recording paper P that has been transported to the printing position upon the platen 20 while the carriage 24 moves back and forth along the guide shaft 23. At this time, noise from the operation sound of the carriage motor, sliding noise of the recording paper P, noise resulting from the movement of the carriage 24, and so on are generated. When printing onto the recording paper P is finished, the recording paper P is transported to the discharge port 19 and is discharged to the exterior of the recording apparatus 11 from the discharge port 19. At this time, in the housing space portion 30, noise is once again generated due to the operating sound of the paper feed motor (not shown), the sliding sound of the recording paper P sliding along the platen 20, and so on.

In this manner, various noises are generated within the housing space portion 31 while a printing process is carried out by the recording apparatus 11. The noise generated within the housing space portion 30 at the time of the printing process propagates and diffuses throughout the interior of the housing space portion 30. At this time, the diffusion of the noise toward the rear of the carriage 24 within the housing space portion 30 is suppressed, and the noise is conducted toward the communication tube portions 32 formed in the partition wall 31 by the first conductive member 34 provided in the spatial region above the carriage 24. Furthermore, the diffusion of noise toward the discharge port 19 is suppressed and the noise is conducted toward the communication tube portions 32 by the second conductive member 35 provided in the spatial region above the discharge port 19.

When the noise that has been conducted toward the communication tube portions 32 within the housing space portion 30 by the first conductive member 34 and the second conductive member 35 reaches the communication tube portions 32, the noise advances into the communication tube portions 32 from the openings on the bottoms of the communication tube portions 32. Sound resonates within the communication tube portions 32, and thus the communication tube portions 32 generate friction; as a result, the air within the communication tube portions 32 vibrates intensely. The noise of the specific frequency is converted into heat energy within the communication tube portions 32, thus dampening the sound.

Then, the noise of frequencies aside from the specific frequency that has not been dampened by the communication tube portions 32 passes through the communication tube portions 32 and is absorbed by the sound absorption material 33 that covers the openings on the top end of the communication tube portions 32, which are on the side of the scanner space portion 28.

Furthermore, noise that has advanced into the scanner space portion 28 without being dampened or absorbed by the communication tube portions 32 or the sound absorption material 33 reaches the document platform glass 26 disposed so as to oppose the partition wall 31 in the axial direction of the communication tube portions 32. Here, the document platform glass 26 is an internal surface area that is orthogonal to (intersects with) the axial direction of the communication tube portions 32. Furthermore, the document platform glass 26 is formed of a high-density member whose surface density is higher than the material of the wall surfaces that form the wall surface areas serving as the other inner walls of the scanner space portion 28. Because the document platform glass 26 has a high degree of transmission loss with respect to sound, the majority of the noise that has reached the document platform glass 26 does not pass therethrough, and is instead reflected toward the partition wall 31. The reflected noise is once again absorbed by the sound absorption material 33 in the partition wall 31, thus suppressing the noise from reentering into the housing space portion 30.

According to the embodiment described thus far, the following effects can be achieved.

(1) With the recording apparatus 11 according to the embodiment, noise generated in the housing space portion 30 that is of a specific frequency is dampened by the resonation effect of the communication tube portions 32 formed in the partition wall 31. Noise of a frequency aside from the specific frequency that has passed through the communication tube portions 32 is reflected and blocked by the document platform glass 26 that is disposed as a surface opposing the partition wall 31 within the scanner space portion 28. Accordingly, the noise can be suppressed from escaping to the exterior of the recording apparatus 11, and noise of the entire frequency range that has been generated within the recording apparatus 11 can be reduced.

(2) With the recording apparatus 11 according to the embodiment, noise of the entire frequency range is absorbed by the noise absorption material 33 disposed at the openings of the communication tube portions 32 when the noise passes through the communication tube portions 32. Accordingly, noise aside from noise in the specific frequency range can be absorbed, thus making it possible to effectively reduce noise.

(3) With the recording apparatus 11 according to the embodiment, noise that has been reflected back toward the communication tube portions 32 after striking the document platform glass 26 within the scanner space portion 28 is once again absorbed by the noise absorption material 33 that covers the top openings of the communication tube portions 32 that are on the side of the scanner space portion 28, thus making it possible to reduce noise in an even more effective manner.

(4) When the recording apparatus 11 according to the embodiment, the diffusion of noise toward the rear of the carriage 24 and the discharge port 19 is suppressed and the noise is conducted toward the communication tube portions 32 by the first conductive member 34 and the second conductive member 35 provided in the housing space portion 30. Accordingly, the percentage of noise emitted from the discharge port 19 of the recording apparatus 11 can be reduced, thus making it possible to absorb and block noise in an effective manner.

(5) With the recording apparatus 11 according to the embodiment, two existing elements, or the scanner space portion 28 in which the scanner carriage moves back and forth within the scanner unit 13 and the document platform glass 26, also act as the inner walls of the partial space portion and the high-density member that function as a resonating space for absorbing and blocking noise. For this reason, it is not necessary to increase the number of components in the recording apparatus 11 or secure further space for the resonating space. Accordingly, noise can be reduced while also suppressing an increase in the size of the apparatus.

(6) With the recording apparatus 11 according to the embodiment, the communication tube portions 32 are provided along the movement direction of the carriage 24, which makes it possible to effectively reduce noise generated by the carriage 24 during printing.

Note that the aforementioned embodiment may be modified as described hereinafter.

Communication tube portions 32 having various diameters may be formed so as to be interspersed with each other. In this case, the communication tube portions 32 can dampen noise in a uniform manner, without bias toward sound of a specific frequency.

The first conductive member 34 may be provided so as to protrude in the direction that is vertical relative to the bottom surface 31a of the partition wall 31 from the upper surface 24a of the carriage 24 (in FIG. 2, the upward vertical direction).

Although the first conductive member 34 has a cross-sectional shape that is a vertical rectangular shape and the second conductive member 35 has a cross-sectional shape that has an approximately right-angle triangular shape opposing downward with the longest side thereof curved inward, the first conductive member 34 and the second conductive member 35 may be formed having different shapes, such as the first conductive member 34 be same as the shape of the second conductive member 35.

Although two conductive members, or the first conductive member 34 and the second conductive member 35, are provided in the housing space portion 30, it is also possible to provide only one of the two conductive members. Alternatively, it is also possible to provide no conductive members in the housing space portion 30.

Rather than employing the scanner space portion 28 and the document platform glass 26 as the rear space for a resonator that dampens noise and a high-density member for blocking noise, a resonator that includes a high-density member may be provided in the housing space portion 30.

The noise absorption material 33 may be disposed on the openings of the communication tube portions 32 that are on the side of the housing space portion 30. Alternatively, it is also possible not to provide the noise absorption material 33 on the openings of the communication tube portions 32.

Although the aforementioned embodiment describes the ink jet recording apparatus 11 as an example of a recording apparatus, a recording apparatus that ejects and discharges liquids aside from ink may be employed as well. The invention can also be applied in various types of liquid ejecting apparatuses including liquid ejecting heads that eject minute liquid droplets. Note that "droplet" refers to the state of the liquid ejected from the recording apparatus, and is intended to include granule forms, teardrop forms, and forms that pull tails in a string-like form therebehind. Furthermore, the "liquid" referred to here can be any material capable of being ejected by the recording apparatus. For example, any matter can be used as long as the matter is in its liquid state, including liquids having high or low viscosity, sol, gel water, other inorganic agents, organic agents, liquid solutions, liquid resins, and fluid states such as liquid metals (metallic melts); furthermore, in addition to liquids as a single state of a matter, liquids in which the molecules of a functional material made of a solid matter such as pigments, metal particles, or the like are dissolved, dispersed, or mixed in a liquid carrier are included as well. Ink, described in the above embodiment as a representative example of a liquid, liquid crystals, or the like can also be given as examples. Here, "ink" generally includes water-based and oil-based inks, as well as various types of liquid compositions, including gel inks, hot-melt inks, and so on. The following are specific examples of recording apparatuses: recording apparatus that eject liquids including materials such as electrode materials, coloring materials, and so on in a dispersed or dissolved state for use in the manufacture and so on of, for example, liquid-crystal displays, EL (electroluminescence) displays, surface emission displays, and color filters; recording apparatuses that eject bioorganic matters used in the manufacture of biochips; recording apparatuses that eject liquids to be used as samples for precision pipettes; printing apparatuses and microdispensers; and so on. Furthermore, a recording apparatus that performs pinpoint ejection of lubrication oils into the precision mechanisms of clocks, cameras, and the like, recording apparatuses that eject transparent resin liquids such as ultraviolet light-curable resins onto a substrate in order to form miniature hemispheric lenses (optical lenses) for use in optical communication elements, recording apparatuses that eject an etching liquid such as an acid or alkali onto a substrate or the like for etching, or the like may be employed as well. The invention can be applied to any type of these recording apparatuses.

What is claimed is:

1. A recording apparatus, including an image reading unit that reads the content of a document, that records onto a recording medium, the apparatus comprising:
 a recording unit that records onto the recording medium;
 a noise source that generates a noise when recording is being carried out on the recording medium;
 a housing space that houses the recording unit and the noise source;
 a partial space portion that moves an image data obtaining unit for reading the content of the document and obtaining image data back and forth;
 a communication tube that communicates between the housing space and the partial space portion; and
 an inner surface of the partial space portion configured of an inner surface area that intersects with the axial direction of the communication tube and a wall surface area,
 wherein at least part of the inner surface area is a high-density member having a surface density that is higher than the material of which the wall surface area is formed.

2. The recording apparatus according to claim 1, further comprising a sound absorption material, configured of a porous material, that covers an opening of the communication tube.

3. The recording apparatus according to claim 2, wherein the sound absorption material covers the opening of the communication tube on the side that faces the partial space portion.

4. The recording apparatus according to claim 1, further comprising a conductive member that conducts the noise generated by the noise source within the housing space toward the communication tube.

5. The recording apparatus according to claim 1, wherein the high-density member is a document platform that holds the document.

6. The recording apparatus according to claim 1,
 wherein the recording unit includes:
 a platen that supports the recording medium; and
 a carriage in which is provided a recording head that ejects a liquid onto the recording medium,
 wherein the noise source is noise emitted from the platen and the carriage.

* * * * *